United States Patent [19]

Goebel et al.

[11] Patent Number: 5,227,267
[45] Date of Patent: Jul. 13, 1993

[54] DISC ELECTRODE AND BUSBAR FOR AN ELECTROCHEMICAL BATTERY

[75] Inventors: Franz Goebel, Sudbury; David C. Batson, Amesbury; William T. McHugh, Westwood, all of Mass.

[73] Assignee: Yardney Technical Products, Inc., Pawcatuck, Conn.

[21] Appl. No.: 607,807

[22] Filed: Nov. 1, 1990

[51] Int. Cl.⁵ ............................................. H01M 2/26
[52] U.S. Cl. ........................................ 429/161; 429/211
[58] Field of Search .................... 429/161, 128, 211; 29/623.4, 623.1

[56] References Cited

U.S. PATENT DOCUMENTS

| | | | |
|---|---|---|---|
| 3,960,603 | 6/1976 | Morioka et al. | 136/135 R |
| 4,411,970 | 10/1983 | Meyer et al. | 429/161 |
| 4,452,869 | 6/1984 | DeMoully et al. | 429/94 |
| 4,554,227 | 11/1985 | Takagaki et al. | 429/178 |
| 4,646,430 | 3/1987 | Clarke | 29/623.1 |
| 4,683,180 | 1/1987 | Bish et al. | 429/130 |
| 4,964,877 | 10/1990 | Keister et al. | 29/623.1 |
| 4,983,475 | 1/1991 | Delans | 429/160 |

*Primary Examiner*—M. L. Bell
*Assistant Examiner*—Alan Wright
*Attorney, Agent, or Firm*—Henry M. Bissell

[57] ABSTRACT

A high discharge rate electrochemical battery structure is disclosed as having a perforated disc electrode stack comprising pluralities of disc electrodes respectively connected to a pair of busbars. Each disc electrode has a tab with two fins which are bent at 90 degrees to the disc electrode. Each fin is inserted between two parts of the corresponding busbar and welded thereto. The design of the busbars and disc electrodes provides for redundancy of electrical contact, high thermal and electrical conductivity and improved resistance to mechanical shock.

52 Claims, 3 Drawing Sheets

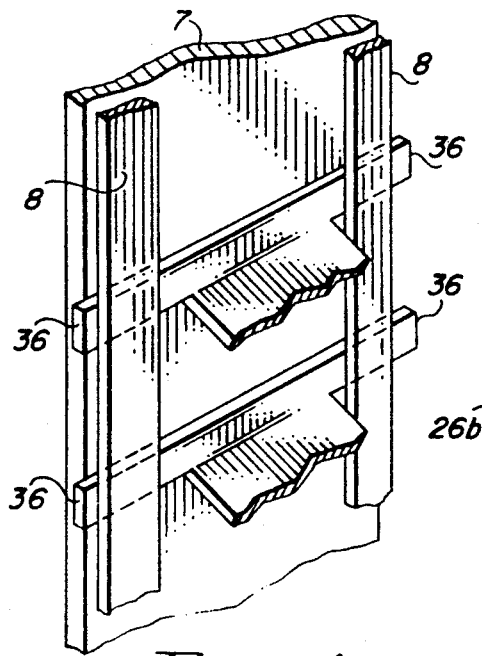
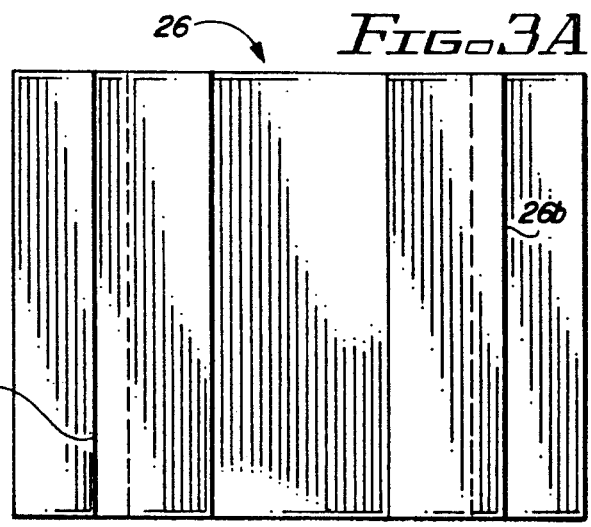
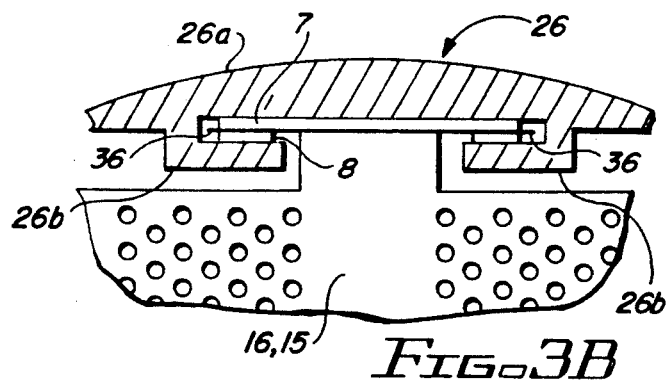
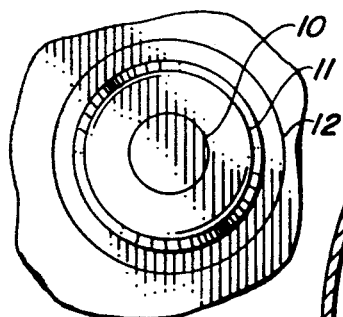
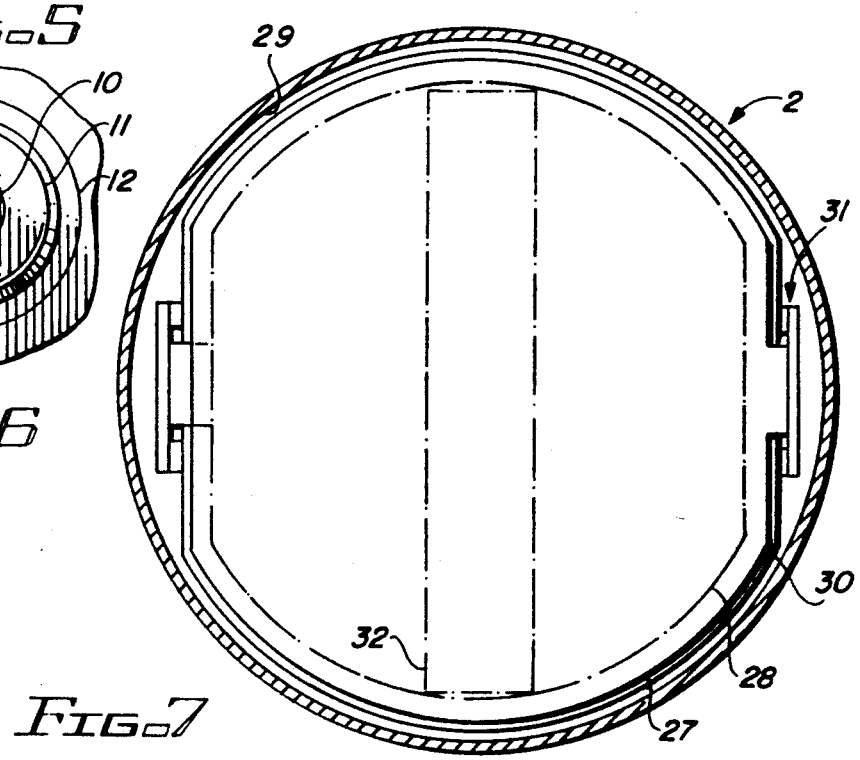

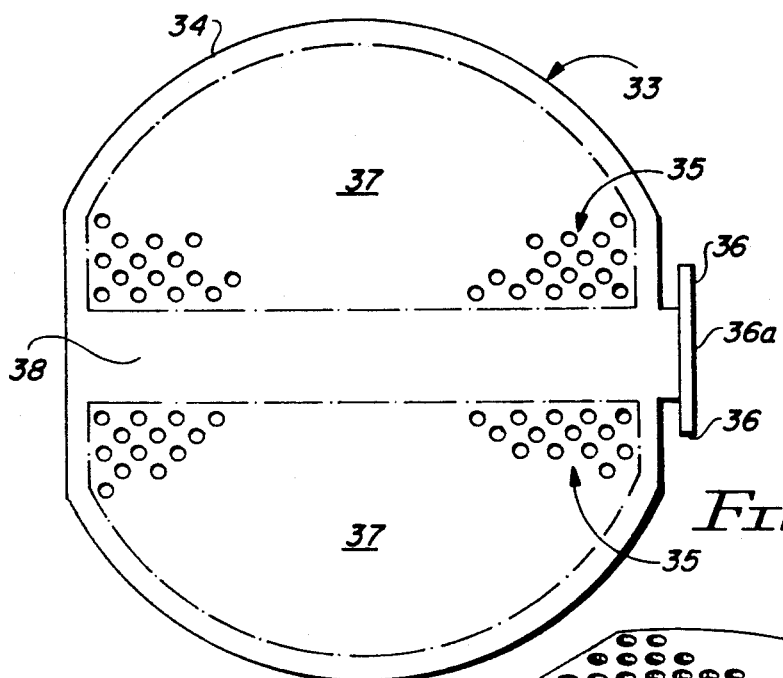
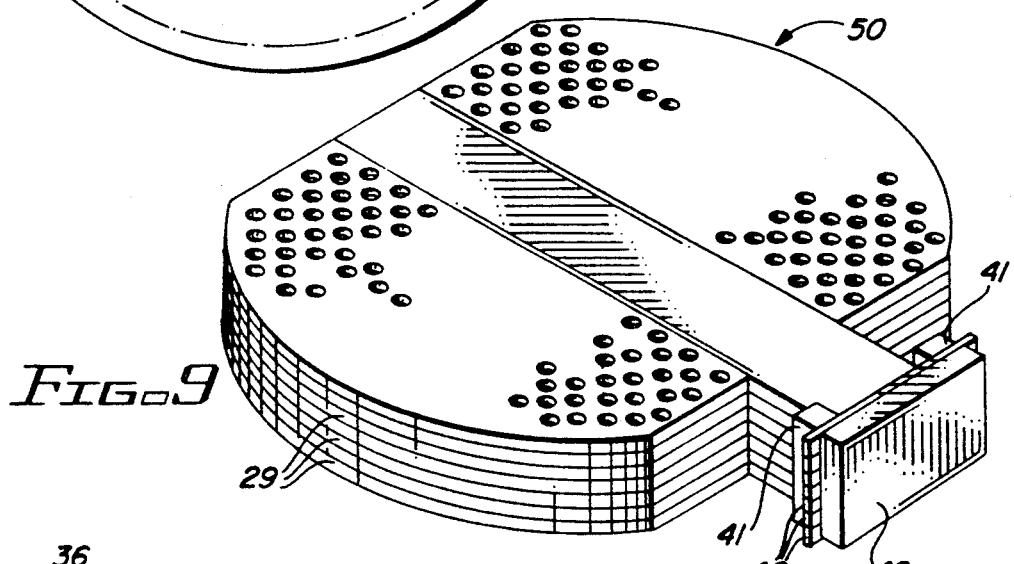
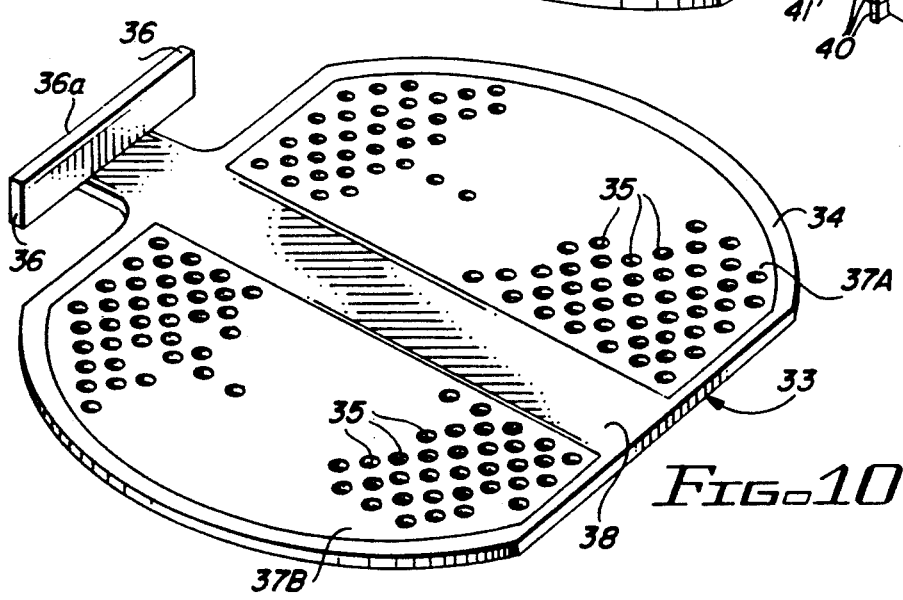

DISC ELECTRODE AND BUSBAR FOR AN ELECTROCHEMICAL BATTERY

This invention was made with Government support under Contract No. 957991 awarded by the Jet Propulsion Laboratories. The Government has certain rights in this invention.

BACKGROUND OF THE INVENTION

Field of the Invention

This invention relates to portable power sources such as batteries and, more particularly, to a structural configuration designed especially for lithium batteries.

Description of the Related Art

For a number of years there has been a need for storage cells or batteries having high energy density, high-rate discharge capability, long life and an ability to operate under a wide range of temperature extremes.

Lithium batteries have thus become of widespread interest of late for their excellent characteristics in all of the above categories when compared to the known magnesium, alkaline and carbon zinc batteries. Just taking temperature performance as an example, at −40 degrees C., a lithium-vanadium pentoxide battery maintains 73% of its room temperature (25 degrees C.) performance and a lithium-sulphur dioxide battery, 60%, while typical magnesium, alkaline and carbon-zinc batteries are virtually useless at that temperature.

Shelf-life at elevated temperatures likewise is superior for lithium batteries. At 54 degrees C., the projected shelf life of a lithium battery exceeds 12 months, while that of a mercury battery is only four months. A magnesium battery has a projected shelf life of only seven months at that storage temperature, while carbon-zinc batteries have a projected shelf life of only 1.5 months.

Lithium organic cells offer higher energy density, superior cold temperature performance, longer active life and greater cost effectiveness. Thus, clearly, lithium batteries are superior to other known types of batteries and it would be highly desirable to maximize their performance characteristics.

A typical prior-art construction of a lithium cell is different from that of mercury and alkaline manganese cells. A lithium foil anode, a separator and a carbonaceous cathode are spirally wound together. This assembly is placed in a steel case, and the anode and cathode are connected with welded tabs to the case and top assembly. Since the electrolyte is non-aqueous, there is no hydrogen gas evolved during discharge. The assembly contains a vent to prevent the build-up of high internal gas pressure resulting from improper use or disposal.

Today there is an increasing demand for high rate performance lithium cells and batteries. The low ionic conductivity of electrolyte used in lithium cells provides very little flexibility for improvement in rate capability. The high rate discharge capability can only be created by special design of the electrodes and their interconnections. High rate cell designs can be achieved by increasing the geometrical electrode surface area per unit volume so that the specific current density does not exceed limitations set forth by the conductivity of the electrolyte. One of the most common electrode designs for small cylindrical high rate cells is the wound electrode structure where long strips of anodes, cathodes, and separators are rolled around a common shaft to form a coil which then is placed into a cylindrical container. The wound configuration of electrodes seems to be an easy and simple electrode arrangement which adapts to high volume production. Some of the disadvantages lie in the ohmic losses along the electrodes, which are several feet in length.

A more efficient design with lower ohmic losses and heat generation is the disc electrode which can be used for higher discharges than the wound design because of shorter current paths and higher conductivities within the metallic substrates. The novel construction of such an electrode and the associated busbar assembly is among the subject matter of this invention. While disclosed in the context of a lithium battery, it should be understood that the novel features of the invention may find application in other types of batteries as well; for example: mercury, nickel cadmium, and magnesium, to name a few. The structural configuration of the present invention may be utilized in various types of batteries other than lithium to develop more rugged units which are subject to shock, vibration and extreme environmental factors.

SUMMARY OF THE INVENTION

In brief, one particular arrangement in accordance with the invention comprises a lithium battery construction with a disc-type substrate having one or two tabs which are 180 degrees offset. The round disc substrate is perforated on either side of a non-perforated bridge connecting the tab(s). A solid border surrounds the entire substrate to prevent sharp edges from being exposed. The two half-moon shaped perforated areas are approximately 50% open and allow for electrolyte diffusion from one side of the electrode to the other. A plurality of the disc electrodes are assembled in an electrode stack which consists of many individual electrode pairs respectively connected in parallel with common busbars for anodes and cathodes.

In accordance with one particular aspect of the invention, a lithium battery incorporates a busbar electrode contact design which minimizes IR losses and simplifies the assembly process of the multielectrode stacks, while achieving high rate discharge capability.

In one particular arrangement in accordance with the invention, the electrode tab is connected to the busbar by fusion welding. The tab is designed to have two fins which are bent inwardly by 90 degrees and each is welded separately to the bus. The fins are designed so that each can carry the maximum current coming from the attached electrodes. Redundancy in contacts will enhance the safety of the cell and assures that all electrodes can be fully discharged to 100% depletion of lithium.

In one preferred embodiment, the fins from each electrode are sandwiched between two flat metal bars so that the ends of the substrate fins protrude slightly beyond the edges of the bus. During welding excess tab material is used to fill the small gaps between two adjacent fins and the metal bars. Welding can be successfully performed with TIG (tungsten inert gas) and laser, as known in the art. Both processes were used with sufficient penetration to make good contact between busbar and electrodes.

The advantages of this design are that it allows a high rate of discharge, has excellent electrical and thermal conductivity, good contact reliability with contact redundancy provided by two welded tabs, shock resistance, volumetric efficient design, and it allows for TIG and laser welding.

DESCRIPTION OF THE DRAWING

A better understanding of the present invention may be realized from a consideration of the following detailed description, taken in conjunction with the accompanying drawing, in which:

FIG. 3A is an elevational view of a busbar support for the battery of FIG. 1;

FIG. 3B shows the busbar support of FIG. 3A in cross-section with an associated electrode partially broken away;

FIG. 4 shows an enlargement of the laser-beam weld connecting the electrode (cathode or anode) to the busbars in the battery of FIG. 1;

FIG. 5 shows the laser-beam weld of the portion 5—5 of FIG. 1 in further detail;

FIG. 6 shows a detailed cross-section of the feedthrough pin structure designated 6—6 in the battery of FIG. 1;

FIG. 7 shows the electrodes of the battery of FIG. 1 in plan view;

FIG. 8 shows one of the electrodes of FIG. 7 in greater detail;

FIG. 9 is an oblique view of a stack of the electrodes of FIG. 7; and

FIG. 10 is a further, oblique view of one of the electrodes of FIG. 7.

DETAILED DESCRIPTION OF THE PREFERRED EMBODIMENTS

Figure 1:
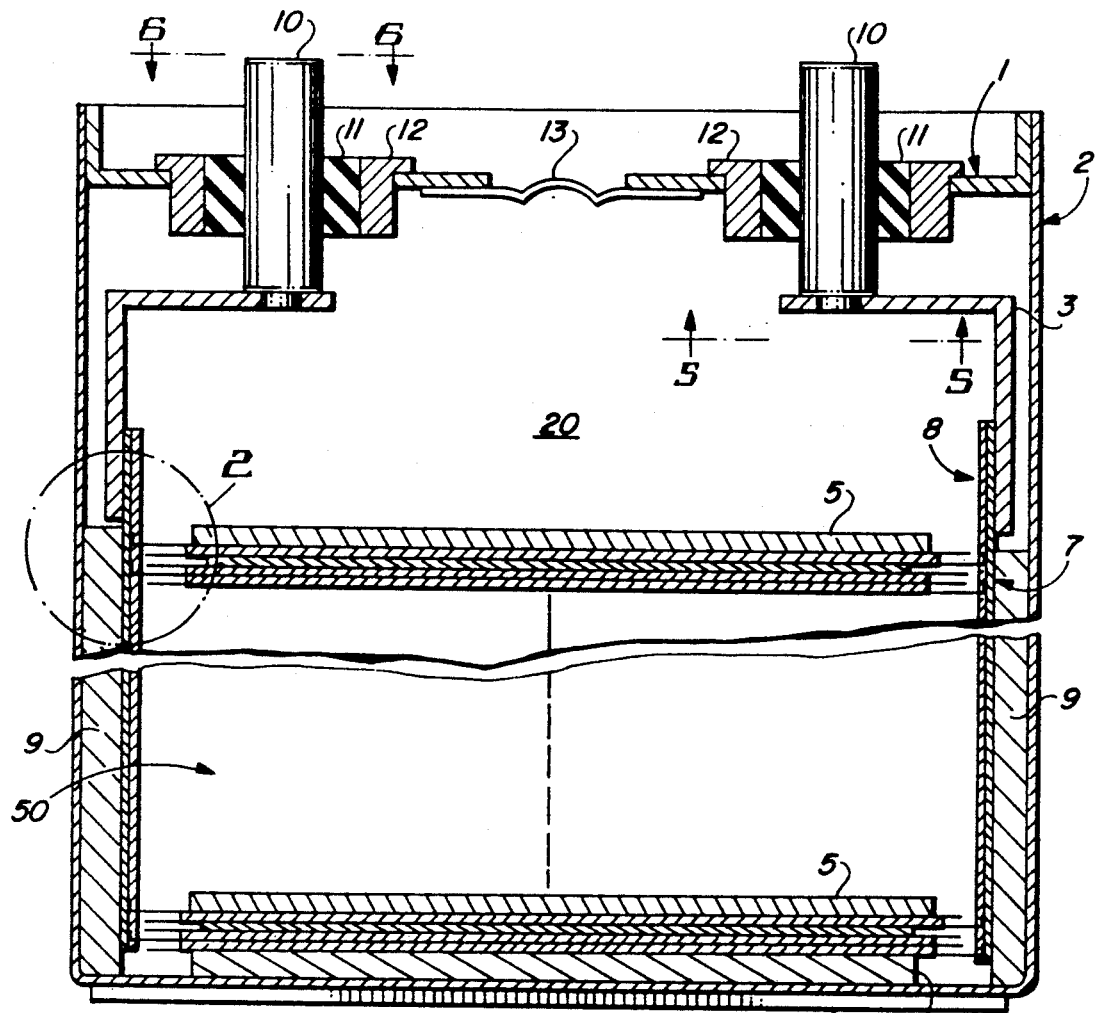
FIG. 1 shows a battery in accordance with the present invention in longitudinal section.

The present invention will be described in greater detail by reference to the drawing figures. FIG. 1 shows a lithium battery as a preferred embodiment of the present invention. However, it should be understood that this is for purposes of detailed description only and is not to be interpreted as limiting the present invention to application in a lithium battery or any one particular type of battery.

In the longitudinal sectional view of FIG. 1, a battery 2 is surmounted by a cover 1. In the center of the cover is a vent 13. Connections are made to the battery by means of feedthrough pins 10 made of Alloy 52. These pins are insulated by means of the feedthrough glass 11 (Corning 9013). The feedthrough pins are held in the cover 1 by means of the feedthrough body 12. The feedthrough pins 10, insulator glass 11 and feedthrough body 12 are shown in cross-section detail in FIG. 6 (Detail 6—6 in FIG. 1).

The feedthrough pins 10 are electrically and mechanically connected to a pair of busbar tabs 3, respectively connected to the busbars 7 and 8, one set being provided on each side of the battery. The busbars are described in greater detail in relation to FIGS. 4, 7 and 9 below. There are, in accordance with the present invention, two types of busbars for each of the positive and negative poles of the battery—one being an inside busbar 8 (provided in pairs) and the other being an outside busbar 7. The busbar tabs and the inside and outside busbars are all made of nickel 200.

The battery case 2 has a liner 9 made of Tefzel. A reinforcing disc 19 is provided at the bottom of the battery case. Corresponding pluralities of carbon cathodes 15 and lithium anodes 16 are in a stacked configuration 50 between assemblies of end plate insulator 5, also made of Tefzel, and end plate 4 mounted respectively at upper and lower ends of the stack 50. Electrolyte 20, having the chemical composition $SOCl_2$, (thionyl chloride) for the solvent and $LiAlCl_4$ (lithium aluminum tetrachloride) for the salt (in the case of a lithium-thionyl chloride battery), fills the space within the battery case 2 surrounding the cathodes, anodes and busbars. Each anode 16 has a substrate 6. Each cathode 15 has a substrate 14. Between each cathode and anode pair there is a porous glass mat separator, 17 or 18.

Figure 2:
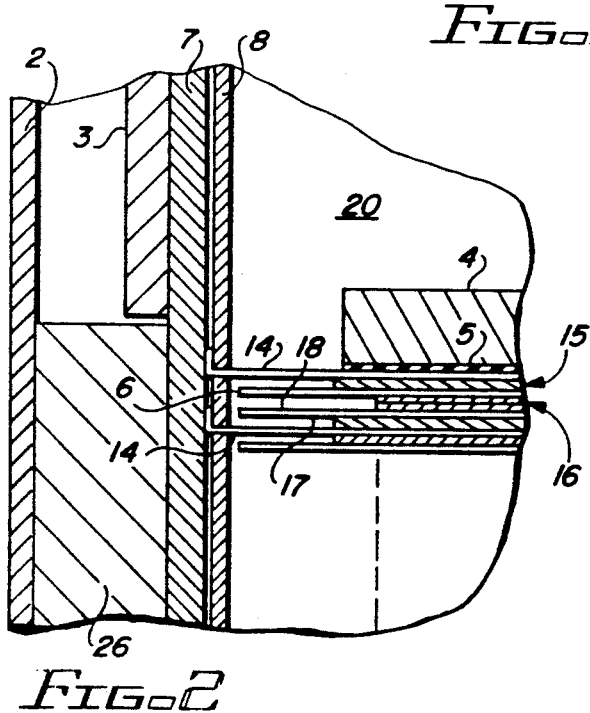
FIG. 2 is an enlargement of Detail 2 of FIG. 1 showing structural details thereof.

A hold-down assembly (not shown) holds down the stack of anodes 16, cathodes 15, and separators 17 and 18, stacked in an alternating arrangement (FIG. 2) of cathode 15, separator 17, anode 16, separator 18, cathode 15, etc., throughout the volume of the electrode stack 50 between end plate insulators 5. A plan view of the stacked electrodes is shown in relation to the electrodes and busbars in the case of the battery 2 in FIG. 7.

FIGS. 3A and 3B show the busbar support for the inside and outside busbars 7 and 8 of FIG. 1. The busbar support is shown in cross-section in FIG. 3B. Seen from the inside of the battery shown in FIG. 1, the busbar support appears as in FIG. 3A.

A plan view of the busbar support and how it attaches to the busbars and disc electrodes is shown in FIG. 3B. The busbar support 26 has an outer, cylindrical surface 26a which contacts the inner surface of case liner 9 (see FIG. 1). On the inner, flat face of busbar support 26 there are two L-shaped flanges 26b. These two flanges create a slot into which fit outer busbar 7 and inner busbars 8. Electrode fin 36 (FIG. 8) is sandwiched between inner and outer busbars 7 and 8. The disc electrode of the present invention, in partial plan view, is shown in FIG. 3B, corresponding to the anode 16 and cathode 15, respectively.

FIG. 4 shows in greater detail the attachment of the electrode substrate of the instant invention to the busbars. The two portions 36 of the anode or cathode are each sandwiched between the outside busbar 7 and one of the inside busbars 8. The fin portions 36 are then laser-beam welded; alternatively TIG (tungsten inert gas) welding may be used to attach the fin portions to the busbars.

These fin portions are shown in greater detail in FIG. 10. Fins 36 are formed by making a 90 degree bend (36a) in electrode substrate 38. Since there are two fin portions 36 for each disc electrode 33, there is redundancy of contact between the electrode and the busbars. Each fin portion 36 is designed to carry the maximum current flow from the attached electrode. This redundancy of contact and current path enhances the safety of the cell and assures that all anodes can be discharged to 100% depletion of lithium.

A further aspect of the instant invention is the configuration of the tabs of the electrodes 16 and 15 which protrude slightly beyond the outer edge of busbars 7 and 8. This excess tab material is used to fill in the small gaps between two adjacent electrode fins and the metal busbars during the welding process.

Turning now to FIGS. 5 and 6, further details of the feedthrough pins are disclosed. FIG. 5, corresponding to Detail 5—5 in FIG. 1, shows the busbar tab 3 as it attaches to feedthrough pin 10. The feedthrough pin is laser-beam welded to the busbar tab. FIG. 6 shows the feedthrough pin 10 as it attaches to the cover 1 of FIG. 1 (Detail 6—6 of FIG. 1). Feedthrough pin 10 is insulated by feedthrough glass 11 (Corning 9013) from feedthrough body 12 which is made of 304L-series stainless steel. Feedthrough body 12 is in turn welded to the cover 1 by laser-beam welding.

FIG. 7 shows the cathodes and anodes (referred to generically as "electrodes") and separators in plan view in relation to the battery of FIG. 1. In this arrangement, the anode 28 is made slightly smaller in diameter than the cathode 27. A separator 30 is slightly larger than the cathode. Porous glass mat is used as the separator material. The anode is made of a nickel 200 substrate with an active layer of lithium on either side. The cathode also has a nickel 200 substrate with an active layer of carbon on either side. The exception is the end electrode at the bottom of the electrode stack shown in FIG. 1. Only the side facing the remainder of the stack is "active" on the end electrode, i.e., has a carbon or lithium layer atop the nickel substrate. The liner is shown at 29, and the busbars and fin connection at 31.

As may be seen in FIG. 7, the cathodes, anodes and separators have a straight margin to the lateral sides of FIG. 7, to allow for the busbars and fins. Thus they measure somewhat less in the lateral direction than the diameter of the circle from which they are cut. The end plate 4 (FIG. 1) is preferably laser-beam welded to a plurality of stack straps (not shown) which are provided to hold the stack 50 of electrodes and separators together.

Turning now to FIG. 8, the disc electrode 33 of the battery of FIG. 1 is shown in greater detail. The round electrode substrate is perforated at 35 on either side of a central non-perforated bridge 38 connected to the tab 36a. A solid border 34 surrounds the entire disc electrode to prevent sharp edges from being exposed. The two half-moon shaped perforated areas 37 are approximately 50% open and allow for electrolyte diffusion from one side of the electrode to the other.

The disc electrode and busbar assembly of the present invention are shown together in FIG. 9. The disc electrodes 39 are placed in a stack 50 of interspersed anodes and cathodes commonly connected to the respective busbar assemblies comprising components 41 and 42. The electrode tab having fins 40 is connected to the busbars 41 and 42 by inserting the fin 40 between busbar components 41 and 42 and welding the busbars and fins together by using laser-beam or TIG welding. The busbar assembly having the components 41 and 42 is then welded to the busbar tab 3 of FIG. 1 which in turn is connected to the feedthrough pin 10 for collection of the discharge current at the terminal. The sets of anodes and cathodes are connected to their respective busbars and feedthrough pins in this manner.

An important feature of the invention is the tab design. The tab 36a has two fins 36. The tab 36a with the fins 36 is bent 90 degrees with respect to the disc electrode plane 33. This 90 degree bend is shown more clearly in FIG. 10. There, the tab 36a having two fins 36 is shown having a 90 degree bend with respect to the disc electrode 33. The unperforated bridge portion 38 is shown in FIG. 10, as is the unperforated border 34. Also shown in FIG. 10 is the unperforated area 37 surrounding individual perforations 35. Full circles are used for the perforations, which may be made, for example, by either the well-known photo-etching method or by punching. Other shapes, such as square, rectangular, elliptical, etc. may be used as desired. In the preferred embodiment depicted in FIG. 10, for example, the individual perforations are 0.060 inches in diameter and are laid out in the rhombic pattern shown in the figure.

Although there have been described hereinabove various specific arrangements of an improved disc electrode and busbar in a lithium battery in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. An electrochemical battery comprising:
   a case having a cover;
   a pair of positive and negative polarity terminals extending externally of said battery;
   a pair of busbar assemblies, one for each of said terminals and connected thereto within said case, each assembly comprising:
   a pair of inner busbars; and
   an outer busbar adjacent said inner busbars between said inner busbars and the case;
   a stack of separate partially open disc electrodes comprising a first plurality of anode elements and a second plurality of cathode elements, the respective anode and cathode elements having electrode tabs welded to the inner and outer busbars of corresponding assemblies;
   separator means positioned between adjacent pairs of the disc electrodes; and
   an electrolyte solution surrounding the disc electrodes, separator means and busbars.

2. The battery of claim 1 wherein the disc electrodes have a circular shape except for two laterally-opposite flat edges, at least one of said flat edges having an electrode tab projecting therefrom for connection to a corresponding busbar assembly.

3. The battery of claim 2 wherein each disc electrode includes a central non-perforated bridge portion generally diametrically oriented between said flat edges and having a segment extending past one of said edges to support said electrode tab.

4. The battery of claim 3 wherein said electrode tab includes a pair of electrode fins at the outer ends thereof extending transversely to said bridge portion.

5. The battery of claim 4 wherein the portion of said electrode tab comprising the pair of fins is bent at a 90 degree angle to said bridge portion with the fins extending respectively beyond opposite side edges of the bridge portion.

6. The battery of claim 3 wherein each disc electrode further includes a pair of perforated portions, one on each side of the non-perforated bridge portion.

7. The battery of claim 6 wherein each disc electrode further includes a non-perforated border extending about the periphery of the disc electrode.

8. The battery of claim 7 wherein said perforated portions are in the form of two generally half-moon-shaped segments in which the perforations in the aggregate constitute approximately 50% of the perforated area.

9. The battery of claim 8 wherein said perforations are equal in size and circular in shape.

10. The battery of claim 3 wherein said disc electrodes have a three-layered structure comprising a generally planar substrate with an active layer on either side.

11. The battery of claim 10 wherein the substrate is made of nickel 200.

12. The battery of claim 11 wherein the active layers of the anode elements are made of lithium.

13. The battery of claim 12 wherein the active layers of the cathode elements are made of carbon.

14. The battery of claim 13 wherein the electrolyte solution comprises a salt of lithium aluminum tetrachloride in a solvent of thionyl chloride.

15. The battery of claim 14 wherein the separator means comprise a plurality of individual disc-shaped separators.

16. The battery of claim 15 wherein the separators are made of porous glass mat.

17. The battery of claim 15 wherein the cathode elements and the separators are larger in diameter than the anode elements.

18. The battery of claim 1 wherein the two inner busbars of a busbar assembly are of smaller cross-sectional dimensions than the outer busbar, and the two inner busbars are arrayed side by side with opposed outboard edges being even with the adjacent edges of the outer busbar.

19. The battery of claim 5 wherein the two inner busbars of a busbar assembly are of smaller cross-sectional dimensions than the outer busbar, and the two inner busbars are arrayed side by side with opposed outboard edges being even with the adjacent edges of the outer busbar, and further wherein the electrode fins of associated electrode elements are inserted between said inner busbars and said outer busbar to protrude slightly beyond the edges thereof.

20. The battery of claim 19 wherein said electrode fins are welded to said inner and outer busbars during welding of each busbar assembly.

21. The battery of claim 20 wherein said electrode fins are welded to said busbars by laser beam welding.

22. The battery of claim 20 wherein said electrode fins are welded to said busbars by tungsten insert gas welding.

23. The battery of claim 20 wherein the portion of each electrode fin which protrudes beyond said edges fills adjacent gaps between the inner and outer busbars when welding of the busbar assembly is performed.

24. The battery of claim 19 wherein each busbar assembly further includes a busbar support member extending along an associated set of inner and outer busbars, said support member having a pair of L-shaped flanges defining a recess in which said inner and outer busbars are mounted.

25. The battery of claim 24 wherein said case is in the shape of a right circular cylinder, and wherein said busbar support member includes a curved outer surface to fit an adjacent portion of the inner bore of said case.

26. The battery of claim 25 further including a cylindrical liner of insulating material lining the inner wall of said case and extending between the case and the busbar support of each busbar assembly.

27. The battery of claim 25 wherein said cover is shaped as a semi-exposed shallow cylinder, has a diameter matching the inner diameter of the case, and is sealingly mounted in one end of the case.

28. The battery of claim 27 further including a reinforcing disc mounted in sealing relationship across the end of the case remote from the cover.

29. The battery of claim 27 wherein said cover includes means for mounting said positive and negative polarity terminals therein, said mounting means comprising, for each terminal, a feedthrough body in the form of a feedthrough glass having a feedthrough pin extending therethrough.

30. The battery of claim 29 further including a pair of busbar tabs extending between respective ones of said feedthrough pins and corresponding busbar assemblies, said busbar tabs being electrically and mechanically connected to said pins and assemblies.

31. The battery of claim 30 wherein the connections between the busbar tabs, the pins and the busbar assemblies are formed by welding.

32. A busbar assembly for an electrochemical battery containing a plurality of generally circular disc-shaped electrodes, said electrodes having mounting elements projecting therefrom and comprising alternate anode and cathode elements interspersed with separators in a stack array, the busbar assembly comprising:
    an elongate outer busbar of generally rectangular cross section extending longitudinally along the height of said stack array; and
    a pair of elongate inner busbars having cross sectional dimensions sufficiently smaller than the dimensions of the outer busbar to permit the inner busbars to be arrayed in side-by-side relationship along the inner face of the outer busbar;
    said inner busbars being generally equal in length to the outer busbar and being arrayed alongside the outer busbar with generally co-terminal outer edges; and
    said inner busbars co-acting with said outer busbar to clamp between them the projecting mounting elements of the electrodes associated with the busbar assembly.

33. The busbar assembly of claim 32 wherein said mounting elements are welded together with an adjacent inner busbar and the outer busbar.

34. The busbar assembly of claim 32 wherein the mounting elements of each of said electrodes comprise a pair of mounting fins extending from the electrode at right angles to the electrode and wherein the busbar assembly is dimensioned such that the fins extend along the outer busbar to protrude between respective inner and outer busbars and beyond the outer edges thereof, said protruding portions being welded to the inner and outer busbars.

35. The busbar assembly of claim 34 further including a busbar support member having means defining a recess for receiving and retaining the assembled busbars and mounting elements therein and an arcuate outer surface remote from said recess defining means for mating with the inner surface of the battery in a fixed juxtaposition therein.

36. An electrode for an electrochemical battery having at least one terminal, the electrode comprising:
    a disc-shaped, generally planar metal substrate having an active material deposited thereon;
    said electrode being generally circular except for a pair of opposed flat edges at opposite ends of a diametrically aligned bridge portion of said electrode;
    said bridge portion having a segment extending from the disc-shaped electrode past one of said flat edges to form an electrode tab for electrically coupling the electrode to a corresponding terminal of the battery.

37. The electrode of claim 36 wherein said electrode tab includes a pair of electrode fins at the outer ends thereof extending transversely to said bridge portion.

38. The electrode of claim 37 wherein the portion of said electrode tab comprising the pair of fins is bent at a 90degree angle to said bridge portion segment with the fins extending respectively beyond opposite side edges of the bridge portion segment.

39. The electrode of claim 38 wherein the bridge portion, extending segment, tab and fins comprise means for mounting the electrode in a selected position in said battery and protecting said electrode against damage from shock and vibration.

40. The electrode of claim 36 further including a pair of perforated portions, one on each side of the central bridge portion.

41. The electrode of claim 40 wherein each disc electrode further includes a non-perforated border extending about the periphery of the disc electrode.

42. The electrode of claim 41 wherein said perforated portions are in the form of two half-moon-shaped segments in which the perforations in the aggregate constitute approximately 50% of the perforated area.

43. The electrode of claim 42 wherein said perforations are equal in size and circular in shape.

44. The electrode of claim 36 wherein said electrode has a three-layered structure comprising a generally planar substrate with an active layer on each side of the substrate.

45. The electrode of claim 44 wherein the substrate comprises nickel 200.

46. The electrode of claim 45 wherein the active material is lithium for an anode.

47. The electrode of claim 45 wherein the active material is carbon for a cathode.

48. The method of fabricating an electrochemical battery comprising the steps of:
   forming a plurality of disc-shaped electrodes with active opposite surfaces thereon;
   forming a plurality of disc-shaped separators of porous glass mat;
   forming a plurality of perforations in half-moon shaped portions on each side of a central unperforated bridge portion of each of said electrodes;
   forming the bridge portions with an extension to one end having a right-angled electrode tab with mounting fins extending transversely outward from the bridge portion;
   assembling a plurality of electrodes interspersed with separators in a stack array comprising a repetitive series of anode, separator, cathode, separator, anode, separator, etc. with the electrode tabs of the anodes and the electrode tabs of the cathodes being aligned in respective generally planar sets on opposite sides of the stack array;
   attaching corresponding busbar assemblies to the respective anode and cathode electrode tab sets on opposite sides of the stack array; and
   electrically and mechanically connecting the busbar assemblies to respective terminals which extend outside the battery.

49. The method of claim 48 further including positioning an elongate outer busbar along the outside of the aligned electrode tabs, positioning a pair of inner busbars along the outer busbar on the side of the electrode tabs remote from the outer busbar to form a pair of sandwich configurations of an inner busbar, the aligned electrode tabs, and the outer busbar.

50. The method of claim 49 further including the steps of placing the electrode tabs in said sandwich configurations so that the ends of said tabs project slightly beyond the adjacent edges of the inner and outer busbars, and welding the tabs to the busbars so that projecting tab material flows into and fills any remaining gaps between the busbars.

51. The method of claim 50 further including the steps of forming feedthrough pins and mounting said pins in a cover of the battery, forming a busbar tab for each busbar assembly, and welding said busbar tab at opposite ends thereof to an associated busbar assembly and an associated feedthrough pin.

52. The method claim 51 further including filling the battery with electrolyte consisting of the salt lithium aluminum tetrachloride in a solvent of thionyl chloride.

* * * * *